United States Patent [19]
Hukki

[11] 3,905,894
[45] Sept. 16, 1975

[54] APPARATUS FOR WET FINE SCREENING

[75] Inventor: Risto Tapani Hukki, Otaniemi, Finland

[73] Assignee: Murskauskone Oy, Salpakangas, Finland

[22] Filed: Oct. 2, 1973

[21] Appl. No.: 402,831

[52] U.S. Cl. .................. 209/17; 209/158; 209/254; 209/306
[51] Int. Cl.² ......................................... B03B 7/00
[58] Field of Search .......... 209/273, 305, 306, 382, 209/13, 17, 268, 254, 155, 157, 158, 159; 210/19, 143

[56] References Cited
UNITED STATES PATENTS

| | | | |
|---|---|---|---|
| 745,450 | 12/1903 | Meyer | 209/306 X |
| 1,011,307 | 12/1911 | Byker | 209/484 |
| 1,856,176 | 5/1932 | Trimbey | 209/306 X |
| 2,347,716 | 5/1944 | Staege | 209/306 X |
| 2,684,154 | 7/1954 | Daman | 209/17 |
| 2,975,899 | 3/1961 | Cannon | 209/273 |
| 3,073,097 | 1/1963 | Hallett | 210/143 X |
| 3,145,165 | 8/1964 | Sandison | 209/254 |
| 3,351,195 | 11/1967 | Hukki | 209/39 |
| 3,438,490 | 4/1969 | Peterson | 209/17 |
| 3,446,349 | 5/1969 | Benzon | 209/273 X |
| 3,474,902 | 10/1969 | Putman | 209/1 |
| 3,483,976 | 12/1969 | Williams | 209/395 |
| 3,726,401 | 4/1973 | Bolton | 209/273 |
| R25,774 | 5/1965 | Hukki | 209/17 |

FOREIGN PATENTS OR APPLICATIONS

| | | | |
|---|---|---|---|
| 16,296 | 1/1904 | Austria | 209/306 |
| 20,980 | 5/1905 | Sweden | 209/306 |
| 26,503 | 11/1913 | Norway | 209/306 |
| 120,924 | 2/1900 | Germany | 209/306 |
| 153,313 | 2/1903 | Germany | 209/306 |
| 430,430 | 6/1935 | United Kingdom | 209/306 |

*Primary Examiner*—Robert Halper
*Attorney, Agent, or Firm*—Darby and Darby

[57] ABSTRACT

A screening vessel comprises an upper section having a cylindrical screen drum and a lower bottom setting section. A plurality of rotatable blades is spaced from the upper screen section for rotating a pulp at a constant angular velocity. The blades are connected to the rim of a feed distribution plate.

8 Claims, 1 Drawing Figure

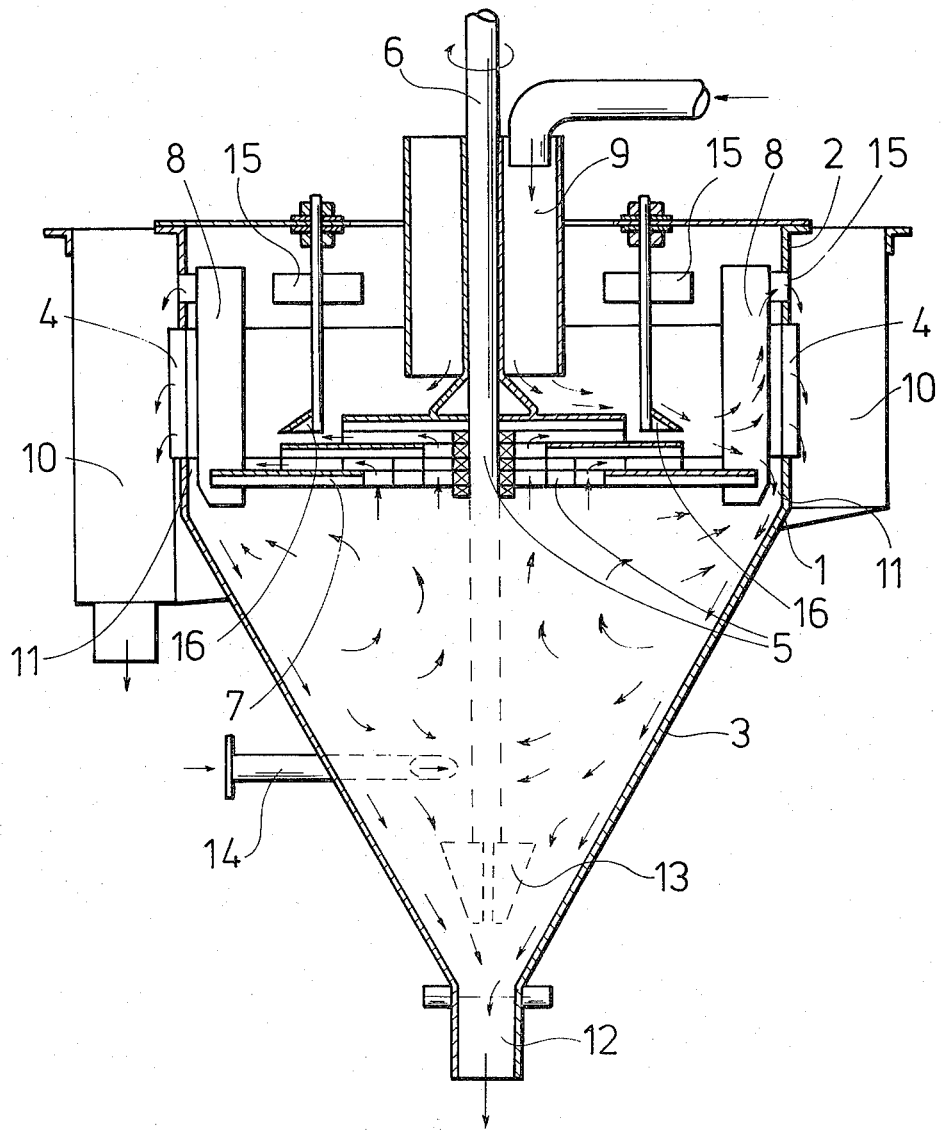

APPARATUS FOR WET FINE SCREENING

It is generally known that within the various branches of process industries a wet screening method and the respective apparatus are sorely needed where the cut size in screening falls within the range between e.g. 100 and 500 microns. In processing ore and mineral pulps produced by wet grinding it is, furthermore, important that the capacity of the unit apparatus is great, e.g. 10–50 tons of dry feed material per hour. In addition it is presupposed that the screen surface remains open and that it well bears the respective burden and wear directed to it. Still more it is presupposed that substantial variations in the coarseness and in the rate of introduction of the feed material do not have an essential effect on the quality of the fine product.

The purpose of this invention is to introduce a wet fine screening method and the respective apparatus which meet the specifications given in the functional field analysed above.

Characteristic to the wet screening method according to this invention is that the pulp to be screened is forced into a pulp ring in positive rotary motion about a vertical axis in such a way that the outer layer of the said pulp ring is drawn at a selected constant angular speed in respect of a concentric cylindrical screen surface. The screen drum does not rotate. The cut size in screening achievable by means of a given screen surface can be regulated by regulation of the angular speed of the outer layer of the created pulp ring into another selected constant value.

This wet fine screening method can also be carried out in another modification where the pulp to be screened is forced into a pulp ring in positive rotary motion about a vertical axis in such a way that the middle stripe of the outer layer of the said pulp ring is drawn at a selected constant angular speed in respect of a concentric cylindrical screen surface, the fraction passing through the screen forming the fine screened product, the topmost stripe of the said layer discharging as a fine overflow product, and the bottom stripe of the said layer discharging downward as a coarse sand product.

From the described method it follows that the disturbing effect to the screening process caused by the oversize material as well as the burdening and wearing effect directed to the screen surface fall out practically entirely as the vertical screen surface will not carry the material to be screened.

Characteristic to the wet screening apparatus according to this invention is that it includes a stationary open vessel with a cylindrical upper section and a conical lower section. A screen drum forms a part of the cylindrical upper section of the apparatus. To cause the fundamental rotary motion of the pulp ring about the vertical axis of the apparatus, it is provided with a central vertical driving mechanism equipped with vertical sweeper blades which control the rotary pulp motion in a very positive way by proceeding in a circular path at the selected constant angular speed in the immediate vicinity of the inside of the screen drum but not touching the drum. To maintain continuous operation, the apparatus is further provided with necessary means for feeding and for collecting and discharging the fine and coarse products.

The mechanism of the apparatus can be made still more complete in such a way that it simultaneously acts as an effective and well adapted distribution means of the feed material. The mechanism is now provided with a disk-shaped distribution plate or with a conical distribution member rotating about the vertical axis of the apparatus at the selected angular speed of the mechanism. The vertical sweeper blades are attached to the rim of the distribution member. The fundamental rotary motion is now limited to that section of the pulp body held above the said distribution means. The diameter of the cylindrical upper section of the apparatus and that of the screen drum are made adequately larger than the diameter of the distribution member in order that the resulting slot in between forms a suitably wide discharge channel for the coarse material downward into the conical lower section of the apparatus. By widening this ring shaped channel the capacity of the apparatus becomes arbitrarily large for the coarse product. Depending on screening conditions the distribution member is placed below the level of the lower rim of the screen drum, on the same level, or above it. To improve mixing of the material to be screened, the apparatus can be further provided with special mixer means placed above the distribution member.

The construction and principle of operation of the wet fine screening apparatus according to this invention is explained more in detail with reference to FIG. 1 which shows a schematic vertical cross section of the apparatus.

As shown by FIG. 1, the screening apparatus includes as the main body stationary open vessel 1 with cylindrical upper section 2 and conical lower section 3. Cylindrical screen drum 4 comprises the middle and/or top zone of the cylindrical upper section. The essential parts of mechanism 5 of the apparatus are vertical shaft 6 placed on the centerline of the apparatus, disk-shaped distribution plate 7 and a series of vertical sweeper blades 8 attached to the rim of the distribution plate. The free vertical slot between the outer edges of blades 8 and the inner surface of drum 4 has a substantially constant width. The known means to support and to rotate the mechanism are not shown. As essential parts the apparatus includes further central feeder ring 9, fine product collect and discharge launder 10 surrounding the upper section of the apparatus, channel 11 in between distribution plate 7 and cylindrical upper section 2 of the vessel to discharge the coarse product from above distribution plate 7 to cone 3, and valve means 12 of any known construction to discharge the coarse product. To keep the settled sand product in continuous fluid state also in the bottom part of cone 3, impeller 13 can be placed on the extension of shaft 6. Dilution and/or wash water often needed in wet screening is introduced via pipe 14 into cone 3. Above the top rim of drum 4, a number of overflow channels 15 can be arranged.

The screen surface proper is preferably built of the so-called wedge-bar type screen plate of any suitable alloy, rubber, or plastic. The drum, shaped from such a plate, is placed so that the trapezoidal bars of the plate are vertical. The outward widening slots between bars are also vertical. The inside surface of the drum is smooth. The screen drum can be combined from a number of similar screen segments. The prefered ratio between the drum height and the drum diameter is from 1:3 to 1:10; thus, the drum is relatively shallow. Rapping or vibrating mechanisms, as such well known, can be attached to the screen drum, to the screen segments, or to a suitable frame carrying the screen means to help in keeping the screen surface open. In such a case, the screen means are separated from the main body of the apparatus by a flexible joint. To regulate the operation of the said mechanisms, the apparatus can be equipped with a sensing device whose regulating effect is based on the height of the pulp level above distribution plate 7. The operation of the mechanisms is started when the pulp level has reached a certain upper limit.

Distribution plate 7 is made of a single plate or of several plates or rings placed on top of each other as shown in FIG. 1. A set of plates is preferably dimensioned so that a gently downward sloping stepway is formed in radial direction from the centerline outward. Between a pair of plates free space can be left if desirable, the said space communicating with cone 3 via openings in respective plate or plates below. Any two superimposed plates can naturally be constructed to imitate the runner of a centrifugal pump to cause positive pulp circulation from cone 3 up and outward. The distribution plate or plate series can be replaced by a downward widening conical distribution member. Into the space above distribution plate 7 a desired number of mixer means 16 can be placed.

The wet screening apparatus according to this invention operates as follows:

With reference to FIG. 1, material to be screened is introduced via feeder ring 9 into the middle part of the apparatus. The feed spreads out in the form of a sheet above plate 7 evenly over the 360° area. The coarsest and heaviest grains arrange themselves into the lowermost layer above which the fine material forms a layer of pulp. All material above distribution plate 7 is caused into rotational motion about a vertical axis by means of the driving mechanism of the apparatus. Forced by positively acting vertical sweeper blades 8 attached to the mechanism the said rotating pulp motion reaches a desired constant angular speed on the outermost rim of the pulp ring. At the same time the acting forces cause the pulp to climb upward to a certain height along the vertical cylindrical wall. This outer pulp layer is drawn at the selected constant angular speed in respect of the nonrotating screen surface. The prefered speed range expressed as peripheral speed is 0.5–5 m/s. Under these circumstances and under a gentle centrifugal force the bulk of fine particles pass readily through the screen in form of relatively dilute pulp flowing into launder 10. That part of solids not passing through the screen discharges via channel 11 downward into cone 3 and therefrom as the final dense coarse product regulated by valve 12 out of the apparatus. In those cases where the middle stripe of the pulp ring only is submitted to screening, the top stripe is discharged via channels 15 as a fine overflow product. This fraction will also include troublesome wooden chips e.g. when treating ores from underground mines.

Regarding the screening process proper, it is already known that by selecting the speed difference between the screen surface and the pulp layer against it to have a proper value, the cut size in screening will be substantially smaller than the free screen opening. Normally one wants to obtain a cut size which is about one-half of the width of the screen slot. This principle of screening is very useful because by means of a relatively wide screen opening or slot it is possible to reach a much smaller cut size. In the screening process according to this invention one obtains the additional benefit that the greater the speed at which the pulp layer is drawn in respect to the screen surface, the lower the cut size obtainable by a given screen surface.

Because from the point of view of sharpness of screening it is essential that all fine particles have the opportunity to get out also from the bottom layer formed by the coarse particles into the pulp ring proper, it is advantageous that the layer of coarse particles moving in the immediate vicinity of the top of distribution plate 7 can be opened, mixed and washed in a sufficient degree. This effect can be made more complete by building distribution plate 7 in steplike fashion as shown in FIG. 1. Removal of small grains is further aided by causing some of wash and/or dilution water to flow via the open spaces between plates in distribution member 7 from cone 3 into the space above the plate. Countercurrent flow of the balance of added water via ring shaped channel 11 upward against the curtain of material settling by gravity helps efficient cleaning of the coarse sand product.

It has already been pointed out that the coarse material does not burden the vertical screen surface. Furthermore it must be noted that wear of the screen surface by the coarse grains is largely eliminated in the present process. Regarding long time wear, however, it is useful that the direction of rotation of the driving mechanism of the apparatus is at selected time interval changeable to even out the wear of the corners of the screen bars. Because the wear is most strongly directed to the inner low rim, it is similarly useful that the drum as a unit can be turned upside down.

Essential regulations within a given apparatus are directed to regulation of the feed rate, regulation of the sand discharge rate, regulation of the speed of rotation of the driving mechanism, regulation of wash and dilution water and regulation of the operation of rapping and/or vibrating mechanisms. A series of water sprays or jets directed against the screen drum from the outside inward can also be used to help in keeping the screen open.

The method of wet fine screening according to this invention and the corresponding screening apparatus apply for processing of all such materials that can be screened wet. In processing mineral products a cut size falling within the range between 100 and 500 microns can be readily reached. It is natural that screening operations with finer and coarser cut sizes than those given above are possible.

The validity of this invention can be demonstrated by the following preliminary experiment:

Cyclone sands obtained from an industrial closed grinding circuit were treated in a wet screening test unit substantially as described in this specification. The screen drum had an inside diameter of 75 cm, an effective height of 10.2 cm, and a total area available for screening of 0.24 m². The slot width in the drum was 500 microns. In a typical test the results were:

feed rate 13.2 t/h (dry metric tons per hour)
fine product 10.6 t/h (dry metric tons per hour)
specific screening capacity 44.2 t/m²h fine product
fineness of the fine product 95 % through 255 micron sieve
sharpness of screening at 255 microns 86.7 %
sharpness of screening at 74 microns 95.0 %

For a comparison it can be stated that the corresponding specific wet screening capacity at the indicated cut size in t/m²h of the conventional trommel screen rotated about a slightly inclined axis is of the order of 1 % of the value found in this experiment.

I claim:

1. Apparatus for wet fine screening of finely divided solids in pulp comprising:
   a screening vessel including an upper section having screen means defining a screening zone in which the fine product is produced and a bottom section for collecting the settling product,
   means for feeding the pulp to be processed into said vessel,
   drive means, a plurality of blades in said upper section of said vessel attached to said drive means and rotated thereby at a distance from said screen means to produce the fine product from the pulp at the screening zone,
   means for collecting the fine product from the screening zone,
   a distribution member rotated by said drive means between said upper section and said lower section, said distribution member including a plurality of plates stacked above one another to form at least one free space therebetween, means for passing the uncollected settling product from said screening zone to said lower section, and an opening in the lowermost plate communicating with said space for returning at least a portion of the settling product from said lower section through said opening and said space to said screening zone.

2. Apparatus as in claim 1 wherein said plates are arranged in the shape of a centrifugal pump member for circulating the settling product through said opening into the screening zone from the bottom section.

3. Apparatus as in claim 1 further comprising means for introducing a dilutant liquid into the settling product in said bottom section.

4. Apparatus as in claim 1 wherein the ratio between the height and the diameter of the screen means is in the range from about 1:3 to about 1:10.

5. Apparatus as in claim 1 wherein said screen means is made of plastic.

6. Apparatus as in claim 1 wherein the screening vessel further comprises overflow channels for the discharge of material from the screening zone.

7. Apparatus for wet fine screening of finely divided solids in pulp comprising:
   a screening vessel including an upper section having screen means defining a screening zone in which the fine product is produced and a bottom section for collecting the settling product,
   means for feeding the pulp to be processed into said vessel,
   drive means, a plurality of blades in said upper section of said vessel attached to said drive means and rotated thereby at a distance from said screen means to produce the fine product from the pulp at the screening zone,
   means for collecting the fine product from the screening zone,
   a distribution member rotated by said drive means between said upper section and said lower section, said distribution member comprising a stepped disc-shaped member with the largest diameter step of the member located closest to said lower section and being spaced from the wall of the vessel to permit the settling product to pass to the lower section, means for passing the uncollected settling product from said screening zone to said lower section, and at least one opening in said distribution member for returning at least a portion of the settling product from said lower section to said screening zone.

8. Apparatus as in claim 7 wherein there are a plurality of said openings for the return of the settling product at various steps of the disc-shaped member.

* * * * *